Feb. 2, 1926.
S. R. EDMONDS
1,571,763
DIMENSION STONE AND SILL MACHINE
Filed June 2, 1925
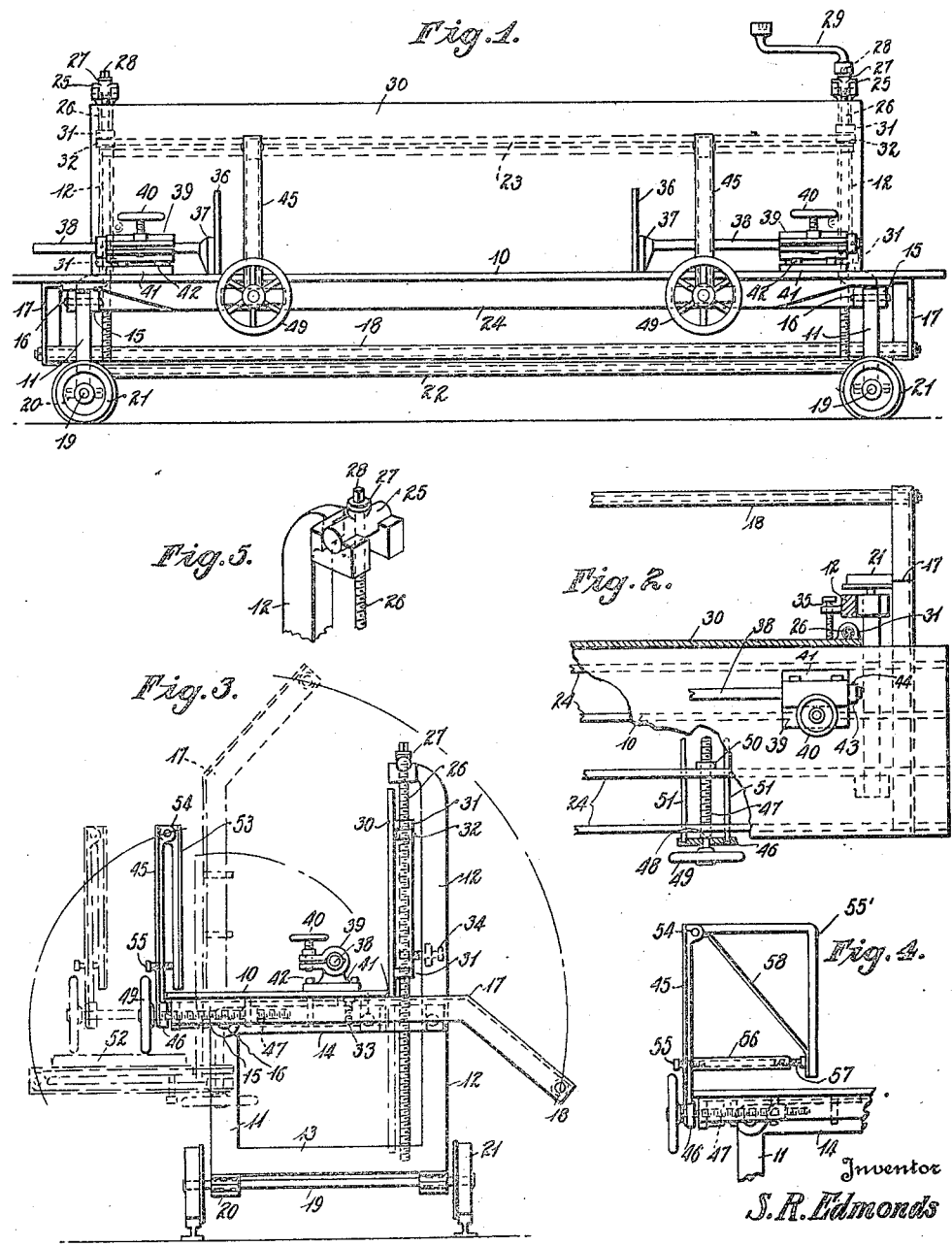
Inventor
S. R. Edmonds
By Knight Bros
Attorneys Patented Feb. 2, 1926.

1,571,763

UNITED STATES PATENT OFFICE.

SAMUEL R. EDMONDS, OF WASHINGTON, DISTRICT OF COLUMBIA.

DIMENSION STONE AND SILL MACHINE.

Application filed June 2, 1925. Serial No. 34,437.

*To all whom it may concern:*

Be it known that I, SAMUEL R. EDMONDS, a citizen of the United States, residing at Washington, District of Columbia, have invented certain new and useful Improvements in Dimension Stone and Sill Machines, of which the following is a specification.

The object of my invention is a machine of the above-mentioned type which, while simple in structure, is universally adjustable so that articles such as dimension stone, pillars, sills and the like may be produced with the greatest possible speed and in a large variety of shapes and sizes. The structure hereinafter described follows in general that already known in the art but adds to these structures such improvements in various details as will greatly simplify the manipulation of the machine and will also enhance the accuracy of the product. My specific improvements will be described with reference to the accompanying drawings, in which Fig. 1 is a side view of a machine embodying my invention;

Fig. 2 is a top plan view of one end of same with parts broken away and parts in section;

Fig. 3 is an end view, parts being shown in optional positions in dotted lines;

Fig. 4 is a modified form of an element of my device; and

Fig. 5 is a detail.

Referring to the drawings, it will be seen that the bed plate 10 is supported on two end frames, each composed of two uprights 11 and 12 and two transverse members 13 and 14. Longitudinal reinforcing ribs 24 are rigidly secured to the under surface of the bed plate. The bed plate is pivoted at opposite longitudinal points, by means of knuckles 15 and pins 16, to the ends of the frame members 11 and 14 at their junction.

Transversely extending angle arms 17 are secured to the ends of the base plate, these arms extending considerably beyond the rear edge of the base plate, that is, the edge opposite the pivot points, and being disposed to the outside of the end frames so that on tipping the bed plate to remove the molded article, the hand-rail 18 will clear the upper ends of the tall uprights 12.

In order that the machine may be easily moved about the plant, it is preferably mounted on axles 19 journaled in boxes 20 fixed on the end frames and provided with flanged wheels 21. The machine is thus adapted to travel on tracks which may be arranged as desired.

The rigidity of the structure thus far described is secured by means of girders as at 22 and 23, Fig. 1, while the rigidity of the base plate is assured by the ribs 24, mentioned above.

It will be noted that the uprights 12 are bent inwardly at their upper ends. The horizontal extremities thus formed are forked, as shown in Figs. 1 and 5, and these forks are each provided with a transverse semicylindrical groove for receiving bearing members 25 having cylindrical trunnions. The bearing members are provided with a smooth vertical bore for receiving the screw spindles 26. These spindles have integral collars 27 so that their axial displacement relative to the bearing members is prevented. By the described structure, however, a swinging movement of the spindles transversely to the machine is allowed. The spindles are provided with square heads 28 to which a crank 29 may be applied for turning them.

The back plate 30 is provided on its rear surface with two sets of vertically aligned brackets 31 having smooth bores through which the spindles extend, (Fig. 3). A nut 32 is placed on each spindle, these nuts having faces contacting with the back plate so that their rotation is prevented. The back plate is thus vertically adjustable and its length is such that its downward travel will not be impeded by the cross-members 14. The position of the base plate relative to the horizontal is determined by set screws 33 screwed in the top of members 14 and in any position of the bed plate the back plate may be swung over into contact therewith by means of adjusting screws 34 working in flanges 35 on uprights 12.

When molding tapered columns and the like, it is desirable that the upper edge of the back plate be adjusted accordingly. Due to the separate suspension of each end of the back plate, one end may be lowered several inches below the other. While there will, of course, be a resultant distortion of the spindles, it will not be of an injurious nature, if they are made of suitable steel.

The end plates 36, which are of course changeable, are supported on heads 37 to which are attached horizontal rods 38. These rods are slidable in spring clamps 39 adjustable by means of screws 40 and supported on pedestals 41. The pedestals are secured to the base plate by bolts 42. Various sets of apertures are provided in the base plate for these bolts so that the pedestals may be secured in various longitudinal positions. Collars 43, settable by means of screws 44, are provided on the ends of rods 38 and are adjusted in accordance with the length of the article to be molded. Thus, after loosening the clamps and moving the end plates back when removing the molded article, the arms 38 can be quickly and accurately returned into their set positions. I have found these slidable arms to be much superior to the ordinary screw adjustment for the end plates. Due to the force exerted on the threads of the screws when tamping the furnish in the mold, considerable play in time develops so that it is difficult to set the plates accurately. Moreover, the sliding arrangement gives much faster operation.

The pallet supports are shown at 45. These are in perpendicular relation to the base plate and are mounted on bearings 46 which are in turn supported on horizontal screw spindles 47. These spindles have reduced neck portions extending through bores in the bearings 46 and by means of the shoulders 48 and hand wheels 49, keyed to the end of the spindles, the bearings are forced to follow the travel of the spindles. The spindles work in smooth bores in ribs 24 and in cooperating nuts 50, which are fixed against rotation. By rotating the hand wheels the vertical pallet supports 45 are adjusted. To prevent the supports from swinging about the spindles, rods 51 parallel thereto, fixed to the bearings 46, and slidable in bores in ribs 24, are provided. These rods also serve to relieve the spindles from undue strain when the pallet rests and pallet 52 assume the discharge position shown in dotted lines at the left of Fig. 3. If the ribs 24 are relatively narrow, as shown, the spindles 47 and rods 51 extend through at least two thereof in order to secure the necessary rigidity.

Inasmuch as it is frequently desirable to support the pallet at an angle to the vertical, it does not rest directly on supports 45 but on arms 53 pivotally connected to the tops of the supports by means of removable pins 54. These joints are such that the arms 53 can swing in both directions from the vertical and screws 55 threaded in supports 45 serve as adjustable abutments for determining the operative positions of arms 53. The horizontal necks of arms 53, the upright portions thereof, and the screws 55 form in effect spacing frames for the pallet.

As will be seen, the inward travel of the pallet supports will be determined by their contact with the edge of the base plate. In order to allow the pallet to be positioned nearer the back plate, I provide auxiliary spacing frames which may be substituted for the removable arms 53. Referring to Fig. 4, each of these frames consists of two main elements, an angle member 55 pivoted at the end of one of its arms to a support 45, and an adjustable bracing rod 56 interposed between the end of the other arm and the rest 45. The member 56 has an internal thread at both ends, and into one end screw 55 is threaded so that the member 56 is secured perpendicularly against the support 45. A set screw 57 in the other end of the member 56 serves as an adjustable abutment for the depending arm of member 55. As shown, the arms of member 55 are in rectangular relation and a reinforcing member 58 is interposed between them. However, the relation of these parts need only be such that proper positioning of the depending arm of member 55 is allowed. A suitable number of auxiliary spacing frames, varying as to the length of the horizontal arm of member 55 and as to the length of brace 56, may be provided to take care of all contingencies.

I claim:

1. In a device of the kind described, a back plate having a normally horizontal upper edge, and independent means at each end of said back plate for vertically adjusting said plate whereby the upper edge thereof may be inclined relative to the horizontal.

2. In a device of the kind described, a normally vertical back plate, a swingable suspension member for supporting said back plate, and means for adjusting said back plate about the pivot point of said suspension member whereby said back plate is adapted to assume an angular position relative to the vertical.

3. In a device of the kind described, a back plate, swingable suspension members for supporting said back plate, and means for vertically adjusting said back plate.

4. In a device of the kind described, a frame including spaced uprights, screw spindles vertically supported by said uprights, and a back plate adjustably supported by said spindles.

5. In a device of the kind described, a frame including spaced uprights, screw spindles swingably suspended from the upper ends of said uprights, and a back plate supported by said spindles.

6. In a device of the kind described, a frame including spaced uprights having laterally extending upper portions, bearing members swingably journaled in said lateral portions, a screw spindle journaled in each of said bearing members and suspended therefrom, threaded members on said spindles, and a back plate supported by said threaded members.

7. In a device of the kind described, an end plate, a horizontal arm for controlling said end plate, a clamp member, said arm being slidable in said clamp member, means for tightening said clamp member on said arm.

8. In a device of the kind described, an end plate, a horizontal arm for controlling said end plate, a clamp member, said arm being slidable in said clamp member, means for tightening said clamp member on said arm, and an adjustable collar on said arm, as and for the purpose described.

9. In a device of the kind described, an end plate, a horizontal arm for controlling said end plate, a clamp member, said arm being slidable in said clamp member, and a screw for tightening said clamp member on said arm.

10. In a device of the kind described, an upright pallet support, an arm pivoted to said support, and means for adjusting the angular relation of said arm to said support.

11. In a device of the kind described, an upright pallet support, an arm pivoted to said support, means for adjusting the angular relation of said arm to said support, and means for adjusting said support and arm in a horizontal direction.

12. In a device of the kind described, an upright pallet support, and means for spacing the pallet therefrom said means comprising two rigidly connected angle arms, means for pivoting one of said arms at its extremity to said support, a brace attachable to said support and abutting the other of said arms, and means for adjusting the length of said brace for controlling the angular relation of said last named arm to said support.

13. In a device of the kind described, an upright pallet support, and means for variably spacing the pallet from said support, comprising interchangeable spacing frames having horizontally extending arms pivotable at one end to said support, an arm depending from the other end of said horizontal arm, the relation of said arms being different in each of said frames whereby said depending arms are spaced at different distances from said support, an adjustable screw in said support adapted to abut the less distant of said depending arms for regulating their angular position relative to said support, and a longitudinally adjustable brace rod adapted to be supported by said screw for abutting the more distant of said depending arms.

14. In a device of the kind described, a horizontal bed plate, a rib fixed to the under surface of said bed plate, a horizontally extending screw spindle in a bore provided in said rib, a vertically extending pallet support carried by said spindle, said spindle being rotatable relative to said support, means preventing the axial displacement of said spindle relative to said support, and means fixed relative to said support and slidable in said rib in parallel relation to said spindle for the purpose described.

15. In a device of the kind described, an underframe, a bed plate pivotally supported thereon in normally horizontal position, a back plate normally perpendicular to said bed plate, and adjusting means for displacing said bed plate relative to said frame about its pivot points, said displacement being relative also to said back plate.

The foregoing specification signed at Washington, D. C. this twenty-fifth day of May, 1925.

SAMUEL R. EDMONDS.